United States Patent
Lee et al.

(10) Patent No.: US 12,435,448 B2
(45) Date of Patent: Oct. 7, 2025

(54) CUT RESISTANT POLYETHYLENE YARN, METHOD FOR MANUFACTURING THE SAME, AND PROTECTIVE ARTICLE PRODUCED USING THE SAME

(71) Applicant: KOLON INDUSTRIES, INC., Seoul (KR)

(72) Inventors: Young-Soo Lee, Seoul (KR); Sang-Mok Lee, Seoul (KR); Seong-Young Kim, Seoul (KR); Sin-Ho Lee, Seoul (KR); Min-Woo Nam, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 459 days.

(21) Appl. No.: 17/435,808

(22) PCT Filed: Mar. 20, 2020

(86) PCT No.: PCT/KR2020/003815
§ 371 (c)(1),
(2) Date: Sep. 2, 2021

(87) PCT Pub. No.: WO2020/190070
PCT Pub. Date: Sep. 24, 2020

(65) Prior Publication Data
US 2022/0049378 A1 Feb. 17, 2022

(30) Foreign Application Priority Data

Mar. 21, 2019 (KR) .................. 10-2019-0032246
Oct. 7, 2019 (KR) .................. 10-2019-0124129

(51) Int. Cl.
*D01F 6/04* (2006.01)
*D01D 5/088* (2006.01)
(Continued)

(52) U.S. Cl.
CPC ............... *D01F 6/04* (2013.01); *D01D 5/088* (2013.01); *D01D 5/098* (2013.01); *D04B 1/16* (2013.01);
(Continued)

(58) Field of Classification Search
None
See application file for complete search history.

(56) References Cited

U.S. PATENT DOCUMENTS

2008/0048355 A1 2/2008 Tam
2011/0092937 A1* 4/2011 Pepper .................. C08L 23/04
526/170
(Continued)

FOREIGN PATENT DOCUMENTS

CN 101568672 A 10/2009
CN 102713030 A 10/2012
(Continued)

OTHER PUBLICATIONS

Machine Translation of CN 104846446 (Year: 2015).*
(Continued)

*Primary Examiner* — Shawn Mckinnon
(74) *Attorney, Agent, or Firm* — Harvest IP Law, LLP (57) ABSTRACT

The present disclosure relates to a polyethylene yarn that enables the production of protective article capable of providing excellent wearability while having high cut resistance, a method for manufacturing the same, and a protective article produced using the same.

7 Claims, 3 Drawing Sheets

(51) Int. Cl.
*D01D 5/098* (2006.01)
*D04B 1/16* (2006.01)
*D04B 1/28* (2006.01)
*D04B 21/16* (2006.01)
*D04B 21/20* (2006.01)

(52) U.S. Cl.
CPC ............... *D04B 1/28* (2013.01); *D04B 21/16* (2013.01); *D04B 21/207* (2013.01); *D10B 2321/0211* (2013.01); *D10B 2401/063* (2013.01); *D10B 2501/041* (2013.01)

(56) References Cited

U.S. PATENT DOCUMENTS

| | | | |
|---|---|---|---|
| 2013/0029552 A1 | | 1/2013 | Fukushima |
| 2022/0002914 A1* | | 1/2022 | Lee ..................... D01F 6/04 |

FOREIGN PATENT DOCUMENTS

| | | | |
|---|---|---|---|
| CN | 104846446 | * | 8/2015 |
| CN | 106544769 | * | 3/2017 |
| CN | 206109615 U | | 4/2017 |
| EP | 2537965 A1 | | 12/2012 |
| JP | S63-135512 A | | 6/1988 |
| JP | 08140538 A | | 6/1996 |
| JP | 2010501740 A | | 1/2010 |
| JP | 2011168926 A | | 9/2011 |
| JP | 5005033 B2 | | 8/2012 |
| JP | 2014001087 A | | 1/2014 |
| JP | WO2018021522 | * | 7/2018 |
| KR | 1020160082512 A | | 7/2016 |
| KR | 101175142 | * | 9/2017 |
| KR | 1020180120373 A | | 11/2018 |
| KR | 101954356 B1 | | 2/2019 |
| KR | 1020190012828 A | | 2/2019 |
| TW | 201124569 A | | 7/2011 |
| WO | 2002-048436 A1 | | 6/2002 |
| WO | 2012117596 A1 | | 9/2012 |
| WO | 2020138971 A1 | | 7/2020 |

OTHER PUBLICATIONS

Machine Translation of KR101175142 (Year: 2017).*
Machine Translation of CN106544769 (Year: 2017).*
Machine Translation of JPWO2018021522 (Year: 2018).*
ASTM D1238 "Standard Test Method for Melt Flow Rates of Thermoplastics by Extrusion Plastometer" Jan. 1, 2013 vol. D1238, pp. 284-299, XP009195312.
European search report (EESR) dated Jan. 13, 2023.
International Search Report dated Jun. 19, 2020.
Search Report of the corresponding Taiwanese Patent Application No. 109109491 dated.

* cited by examiner

CUT RESISTANT POLYETHYLENE YARN, METHOD FOR MANUFACTURING THE SAME, AND PROTECTIVE ARTICLE PRODUCED USING THE SAME

CROSS REFERENCE TO RELATED APPLICATIONS

This application is a National Stage of International Application No. PCT/KR2020/003815 filed Mar. 20, 2020, claiming priority based on Korean Patent Application No. 10-2019-0032246 filed Mar. 21, 2019 and 10-2019-0124129 filed Oct. 7, 2019.

TECHNICAL FIELD

The present disclosure relates to a cut resistant polyethylene yarn, a method for manufacturing the same, and a protective article produced using the same, and more particularly, to a polyethylene yarn that enables the manufacture of a protective article capable of providing excellent wearability while having high cut resistance, a method for manufacturing the same, and a protective article produced using the same.

BACKGROUND ART

People engaged in the field of security, such as police and military personnel, as well as those who handle sharp cutting tools in various other industrial fields are always exposed to risk of injury. Protective articles such as gloves or clothes should be provided to minimize the risk of injury.

The protective article is required to have a cut resistance in order to properly protect the human body from a weapon or a sharp cutting tool such as a knife.

In order to provide high cut resistance to protective articles, high-strength polyethylene yarns are used for the manufacture of these protective articles. For example, the high-strength polyethylene yarn is used alone for the manufacture of fabrics, or the high-strength polyethylene yarn and other types of yarn(s) may be used together to form a plied yarn, and then the plied yarn may be used for the manufacture of fabrics.

It is known that an ultra-high molecular weight polyethylene (hereinafter referred to as "UHMWPE"), which is a type of high-strength polyethylene yarn, is generally a yarn formed of a linear polyethylene having a weight average molecular weight of 600,000 g/mol or more, and due to the high melt viscosity of UHMWPE, it can be produced only by gel spinning method. For example, ethylene can be polymerized in the presence of a catalyst in an organic solvent to prepare a UHMWPE solution, the solution is spun and cooled to form a gel in the form of fibers, and the gel in the form of fibers can be drawn to obtain a high-strength and high-modulus polyethylene yarn. However, since this gel spinning method requires the use of an organic solvent, not only environmental problems are caused, but also huge costs are required for recovering the organic solvent.

Generally, since a high-density polyethylene, which is a linear polyethylene having a weight average molecular weight of 20,000 to 600,000 g/mol, has a relatively low melt viscosity compared to UHMWPE, it is melt-spinnable, and as a result, environmental problems and high cost problems that cannot be avoided in the gel spinning method can be overcome. However, due to its relatively low molecular weight compared to UHMWPE, the strength of a high-density polyethylene yarn is inevitably lower than that of UHMWPE yarn.

Therefore, continuous attempts have been conducted to improve the strength of high-density polyethylene yarns, and as a result, it has become possible to manufacture protective articles having satisfactory cut resistance even with polyethylene yarns produced through melt spinning.

However, although the high-density polyethylene yarn, which is developed by emphasizing only the improvement of strength, can provide a satisfactory cut resistance to the protective article, it causes serious problems of deteriorating the wearability. In other words, the protective gloves or clothes made of the polyethylene yarn become excessively stiff, which hinders the movement of the wearer (e.g., movement of fingers in the case of gloves) and degrades work efficiency. Such a poor wearability causes avoidance of wearing protective articles and increases the risk of injury.

DETAILED DESCRIPTION OF THE INVENTION

Technical Problem

The present disclosure is directed to a cut resistant polyethylene yarn that can prevent problems caused by the limitations and disadvantages of the related technologies, a method for manufacturing the same, and a protective article produced using the same.

One aspect of the present disclosure is to provide a polyethylene yarn that enables the production of a protective article capable of providing excellent wearability while having high cut resistance.

Another aspect of the present disclosure is to provide a method of manufacturing a polyethylene yarn that enables the production of a protective article capable of providing excellent wearability while having high cutting resistance.

Yet another aspect of the present disclosure is to provide a protective article capable of providing excellent wearability fit while having high cut resistance.

The above and other objects, features and other advantages of the present disclosure will be set forth below, or will be clearly understood from such description by those skilled in the art.

Technical Solution

According to one aspect of the present disclosure, a polyethylene yarn having a weight average molecular weight of 80,000 to 180,000 g/mol, an initial modulus of 100 to 250 g/d and an elongation of 6 to 10% is provided.

The polyethylene yarn may have an initial modulus of 120 to 200 g/d.

The polyethylene yarn may have a dry heat shrinkage at 100° C. of more than 2.5% and 6.0% or less.

The polyethylene yarn may have a ratio of the storage elastic modulus at 50° C. to the storage elastic modulus at 30° C. of 65 to 75%, a ratio of the storage elastic modulus at 80° C. to the storage elastic modulus at 30° C. of 30 to 45%, and a ratio of the storage elastic modulus at 105° C. to the storage elastic modulus at 30° C. of 10 to 25%.

The polyethylene yarn may include 40 to 500 filaments each having a fineness of 1 to 3 denier, and may have a total fineness of 100 to 1,000 denier.

According to another aspect of the present disclosure, there is provided a method for manufacturing a polyethylene yarn comprising the steps of:

melting a polyethylene chip having a melt index (MI) (at 190° C.) of 0.3 to 3 g/10 min to obtain a polyethylene melt;

extruding the polyethylene melt through a spinneret with a plurality of nozzle holes;

cooling a plurality of filaments formed when the polyethylene melt is discharged from the nozzle holes;

converging the cooled filaments to form a multifilament yarn;

drawing and heat setting the multifilament yarn at a total draw ratio of 8 to 20 times; and winding the drawn and heat set multi-filament yarn, wherein the drawing step is performed in a multi-stage drawing manner, and a relaxation rate at the final drawing during the multi-stage drawing is 3% to 8%.

The polyethylene chip may have a weight average molecular weight of 80,000 to 180,000 g/mol.

The drawing step may be performed using a plurality of godet rollers.

The heat setting of the multifilament yarn may be performed by a plurality of godet rollers.

According to another aspect of the present disclosure, there is provided a protective article knitted with a covered yarn, the covered yarn comprising:
the above-mentioned polyethylene yarn;
a polyurethane yarn spirally surrounding the polyethylene yarn; and
a polyamide or polyester yarn spirally surrounding the polyethylene yarn,
wherein the protective article has a cut resistance index of 5.0 or more and a stiffness of 5.0 gf or less.

The protective article may have a cut resistance index of 5.5 to 8.5 and a stiffness of 2.0 to 5.0 gf.

The polyethylene yarn may have a dry heat shrinkage at 100° C. of more than 2.5% and less than 6%.

The weight of the polyethylene yarn may be 45 to 85% of the total weight of the covered yarn, the weight of the polyurethane yarn may be 5 to 30% of the total weight of the covered yarn, and the weight of the polyamide or polyester yarn may be 5 to 30% of the total weight of the covered yarn.

The general description of the present disclosure as set forth above is only for illustrating or explaining the present disclosure, and does not limit the scope of the present disclosure.

Advantageous Effects

The polyethylene yarn of the present disclosure has a high strength of 11 g/d or more despite being manufactured through melt spinning, and thereby, enables the production of a protective article having a high cut resistance index of 5 or more, more preferably 5.5 to 8.5.

In addition, the polyethylene yarn of the present disclosure has a low initial modulus of 250 g/d or less and a high elongation of 6% or more, and thereby, enables the production of a protective article having a low stiffness of 5 gf or less, more preferably 2 to 5 gf (i.e., excellent wearability).

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure.

DESCRIPTION OF SYMBOL

| | |
|---|---|
| 100: extruder | 200: spinneret |
| 300: cooling part | 400: converging part |
| 500: drawing part | 600: entanglement device |
| | 700: winder |
| | 20: protective glove |
| | 21: specimen of protective glove |
| | 21a: side adjacent to the finger of the glove |
| | 21b: side adjacent to the wrist of the glove |
| | f1: outer side of the glove |
| | f2: inner side of the glove |
| | 31: specimen holder |
| | 32: specimen depressor |

DETAILED DESCRIPTION OF THE EMBODIMENTS

Hereinafter, various embodiments of the polyethylene yarn of the present disclosure will be described in detail.

The polyethylene yarn of the present disclosure which is used for the production of protective articles (for example, protective gloves) requiring high cut resistance and is produced through melt spinning may have a weight average molecular weight (Mw) of 80,000 to 180,000 g/mol, an initial modulus of 100 to 250 g/d, and an elongation of 6 to 10%.

In a previous study that has overemphasized only the cut resistance of protective articles, it was proposed to increase the initial modulus of the polyethylene yarn, for example, to 300 g/d or more and lower the elongation, for example, to less than 6%.

However, according to the present disclosure, the cut resistance of the protective article is mainly determined by the strength of the polyethylene yarn, the slippiness of the polyethylene yarn (i.e., properties that slides along the surface without being caught by the yarn when a knife or sharp tool passes over the polyethylene yarn), and the rolling properties of fibers constituting the yarn (i.e., properties of the fibers twisted or curled around the longitudinal axis of the yarn when a knife or sharp tool passes over the yarn), and it is judged that the initial modulus and elongation of the polyethylene yarn no longer have a substantial effect on the cut resistance of the protective product once it reaches a certain level.

Rather, if the initial modulus of the polyethylene yarn is too high and/or the elongation of the polyethylene yarn is too low, the fabric manufactured using such a polyethylene yarn has a high stiffness, the wearability of the protective product is remarkably reduced, and the non-defective yield may be lowered due to poor covering properties and knitting properties.

Therefore, the present inventors have confirmed through experiments that when the polyethylene yarn has an initial modulus of 100 to 250 g/d, an elongation of 6 to 10%, and a weight average molecular weight of 80,000 to 180,000 g/mol, it has excellent strength and cut resistance index, and at the same time, has low stiffness, and so can have improved wearability, thereby completing the present disclosure.

The polyethylene yarn of one embodiment has a weight average molecular weight of 80,000 to 180,000 g/mol, or 120,000 to 160,000 g/mol, or 140,000 to 160,000 g/mol, which make it possible to realize a high strength.

Along with this, the polyethylene yarn of one embodiment has an initial modulus of 100 to 250 g/d and an elongation of 6 to 10%, which make it possible to realize a high cut resistance index and excellent wearability.

Specifically, the polyethylene yarn may have an initial modulus of 100 g/d or more, or 120 g/d or more, or 150 g/d or more; and 250 g/d or less, or 230 g/d or less, or 200 g/d or less. For example, the polyethylene yarn may have an initial modulus of 100 to 250 g/d, or 100 to 230 g/d, or 100 to 200 g/d, or 120 to 250 g/d, or 120 to 230 g/d, or 120 to 200 g/d, or 150 to 250 g/d, or 150 to 230 g/d, or 150 to 200 g/d.

When the polyethylene yarn has an initial modulus of more than 250 g/d or an elongation of less than 6%, the fabric produced using the polyethylene yarn has a high stiffness of more than 5 gf and thus, the fabric is excessively stiff, and the wearer of the protective product can feel uncomfortable.

In case where the polyethylene yarn has an initial modulus of less than 100 g/d or an elongation of more than 10%, as the protective product produced using the polyethylene yarn is continuously used by a user, the cut resistance decreases, pills may be induced in the fabric, and even, the fabric may be damaged.

Meanwhile, the polyethylene yarn of the present disclosure may have a dry heat shrinkage at 100° C. of more than 2.5% and less than 6%.

Specifically, the polyethylene yarn may exhibit a dry heat shrinkage at 100° C. of more than 2.5%, or 2.8% or more, or 3.0% or more; and 6.0% or less, or 5.0% or less, or 4.0% or less, or 3.5% or less. For example, the polyethylene yarn may exhibit a dry heat shrinkage at 100° C. of more than 2.5% and 6.0% or less, or more than 2.5% and 5.0% or less, or more than 2.5% and 4.0% or less, or more than 2.5% and 3.5% or less, or 2.8 to 6.0%, or 2.8 to 5.0%, or 2.8 to 4.0%, or 2.8 to 3.5%, or 3.0 to 6.0%, or 3.0 to 5.0%, or 3.0 to 4.0%, or 3.0 to 3.5%.

When the dry heat shrinkage ratio is 2.5% or less, the initial modulus of the yarn exceeds 250 g/d, and thus the wearability of the protective article may be deteriorated. On the other hand, when the dry heat shrinkage exceeds 6%, there is a problem that the finished article produced with such a yarn (for example, a protective glove) has a high risk of being deformed by shrinkage. According to one embodiment of the present disclosure, by selecting a polyethylene raw material having an appropriate molecular weight and appropriately adjusting the drawing conditions, the dry heat shrinkage of the polyethylene yarn can be adjusted to more than 2.5% and less than 6%.

The polyethylene yarn of the present disclosure may have a ratio of the storage elastic modulus at 50° C. to the storage elastic modulus at 30° C. (hereinafter, "storage elastic retention at 50° C.") of 65 to 75%, or 68 to 75%.

The polyethylene yarn may have a ratio of the storage elastic modulus at 80° C. to the storage elastic modulus at 30° C. (hereinafter, "storage elastic retention at 80° C.") of 30 to 45%, or 35 to 45%, or 37 to 45%.

And, the polyethylene yarn may have a ratio of the storage elastic modulus at 105° C. to the storage elastic modulus at 30° C. (hereinafter referred to as "storage elastic retention at 105° C.") of 10 to 25%, or 15 to 25%, or 20 to 25%.

By selecting a polyethylene raw material having an appropriate molecular weight, the storage elastic retentions of the polyethylene yarn can be adjusted respectively within the above ranges.

When the storage elastic retention at 50° C. is less than 65%, or the storage elastic retention at 80° C. is less than 30%, or the storage elastic retention at 105° C. is less than 10%, the strength of the yarn is reduced to less than 11 g/d, making it difficult to produce protective products having satisfactory cut resistance.

On the other hand, if the storage elastic retention at 50° C. exceeds 75%, or the 80° C. storage elastic retention rate exceeds 45%, or the storage elastic retention at 105° C. exceeds 25%, the initial modulus of the yarn exceeds 250 g/d, and thus, the wearability of the protective article may be reduced and the shrinkage may be lowered.

Meanwhile, the polyethylene yarn of the present disclosure may be a multifilament yarn that is a bundle of 40 to 500 continuous filaments. Each of the continuous filaments may have a fineness of 1 to 3 denier, and the polyethylene yarn may have a total fineness of 100 to 1,000 denier.

Meanwhile, the polyethylene yarn of the present disclosure may have a polydispersity index (PDI) of more than 5 and 9 or less for a protective article produced using the yarn. The polydispersity index (PDI) is the ratio (Mw/Mn) of the weight average molecular weight (Mw) to the number average molecular weight (Mn), which is also referred to as the molecular weight distribution index (MWD).

Furthermore, the polyethylene yarn of the present disclosure may have a strength of 11 g/d or more, preferably 11 to 18 g/d, so that the protective article produced using the yarn can have a cut resistance index of 5 or more.

Meanwhile, according to another embodiment of the present disclosure, there can be provided a method for manufacturing the polyethylene yarn comprising the steps of:

melting a polyethylene chip having a melt index (MI) (at 190° C.) of 0.3 to 3 g/10 min to obtain a polyethylene melt;

extruding the polyethylene melt through a spinneret with a plurality of nozzle holes;

cooling a plurality of filaments formed when the polyethylene melt is discharged from the nozzle holes;

converging the cooled filaments to form a multifilament yarn;

drawing and heat setting the multifilament yarn at a total draw ratio of 8 to 20 times; and winding the drawn and heat set multi-filament yarn, wherein the drawing step is performed in a multi-stage drawing manner, and a relaxation rate at the final drawing during the multi-stage drawing is 3% to 8%.

Hereinafter, a method of manufacturing a polyethylene yarn according to one embodiment of the present disclosure will be described in detail with reference to the accompanying FIG. 1.

The method for manufacturing the polyethylene yarn may include melting a polyethylene chip having a melt index (MI) (at 190° C.) of 0.3 to 3 g/10 min to obtain a polyethylene melt.

For example, a polyethylene melt is obtained by first introducing a polyethylene chip into an extruder 100 and melting it.

Polyethylene (hereinafter referred to as 'polyethylene chip') used as a raw material in the method of the present disclosure has a melt index (MI) of 0.3 to 3 g/10 min. In this specification, the melt index of the polyethylene chip is a value measured at 190° C.

When the melt index (MI) of the polyethylene chip is less than 0.3 g/10 min, it is difficult to secure a smooth flowability in the extruder 100 due to the high viscosity and low flowability of the polyethylene melt, the spinning device is overloaded and process control cannot be properly performed, and thus, it is difficult to ensure uniformity of yarn properties. On the other hand, when the melt index (MI) of the polyethylene chip exceeds 3 g/10 min, the flowability of the polyethylene melt in the extruder 100 is relatively good, but due to the low molecular weight of polyethylene, it is difficult to obtain a yarn having high strength properties of 11 g/d or more.

The polyethylene chip may have a weight average molecular weight (Mw) of 80,000 g/mol or more, or 100,000 g/mol or more, or 120,000 g/mol or more. When the weight average molecular weight (Mw) is less than 80,000 g/mol, it is difficult for the finally obtained yarn to have a strength of 11 g/d or more.

Meanwhile, if the weight average molecular weight (Mw), which has generally an inverse relationship with the melt index (MI), is excessively high, exceeding 180,000 g/mol, the spinning apparatus is overloaded due to the high melt viscosity, and the process control is not properly performed, and thus, it is difficult to ensure excellent properties of the yarn. Accordingly, the polyethylene chip preferably has a weight average molecular weight (Mw) of 180,000 g/mol or less, or 170,000 g/mol or less, or 160,000 g/mol or less.

However, the upper limit of the weight average molecular weight (Mw) of the polyethylene chip may be slightly higher than the upper limit of the target molecular weight (i.e., is the weight average molecular weight of the polyethylene yarn and is 80,000 to 180,000 g/mol in the present disclosure), considering that the molecular weight may be slightly decreased due to thermal decomposition of polyethylene during the spinning process.

The polyethylene chip of the present disclosure may have an initial modulus of 100 to 250 g/d and an elongation of 6 to 10%.

The polyethylene chip of the present disclosure may have a polydispersity index (PDI) of more than 5 and 9 or less.

Meanwhile, the method of manufacturing a polyethylene yarn of one embodiment may include extruding the polyethylene melt through a spinneret having a plurality of nozzle holes.

The polyethylene melt is transported to a spinneret 200 having a plurality of nozzle holes by a screw in an extruder 100, and then extruded through the nozzle holes. The number of nozzle holes in the spinneret 200 may be determined according to the DPF (denier per filament) and the total fineness of the yarn to be manufactured. According to one embodiment of the present disclosure, in order to manufacture a yarn having a DPF of 1 to 3 and a total fineness of 100 to 1,000, the spinneret 200 may have 40 to 500 nozzle holes.

The melting process in the extruder 100 and the extrusion process through the spinneret 200 are performed at 150 to 315° C., preferably 250 to 315° C., more preferably 260 to 290° C. That is, it is preferable that the extruder 100 and the spinneret 200 are maintained at 150 to 315° C., preferably 250 to 315° C., more preferably 260 to 290° C. According to one embodiment of the present disclosure, the polyethylene chip is introduced into the extruder 100, and the spaces moving until discharged through nozzle holes of the spinneret 200 is divided into a plurality of parts, thereby controlling the temperature for each divided space. For example, within the temperature range of 150 to 315° C., preferably 250 to 315° C., and more preferably 260 to 290° C., the temperature of each divided space can be controlled such that the divided space temperature at the rear stage is equal to or greater than the divided space temperature at the front stage.

When the spinning temperature is less than 150° C., uniform melting of the polyethylene chip is not achieved due to the low spinning temperature and thus, spinning may be difficult. Meanwhile, when the spinning temperature exceeds 315° C., the thermal decomposition of polyethylene is caused, and thus a high strength expression may be difficult.

The ratio L/D of the hole length L to the hole diameter D of the spinneret 200 may be 3 to 40. When the L/D is less than 3, a die swell phenomenon occurs during melt extrusion and it becomes difficult to control the elastic behavior of polyethylene, resulting in poor spinnability. When the L/D exceeds 40, a yarn breakage may occur due to a necking phenomenon of the polyethylene melt passing through the spinneret 200 and also an irregular discharge phenomenon may occur due to pressure drop.

Meanwhile, the method for manufacturing the polyethylene yarn of one embodiment may include cooling a plurality of filaments formed when the polyethylene melt is discharged from the nozzle holes.

When the polyethylene melt is discharged from the nozzle holes of the spinneret 200, solidification of the polyethylene melt is started due to the difference between the spinning temperature and the room temperature, and a plurality of filaments 11 in a semi-solidified state are formed. In the present specification, not only a semi-solidified filament but also a completely solidified filament is collectively referred to as a "filament."

The plurality of filaments 11 are completely solidified by cooling in a cooling part (or quenching zone) 300. The cooling of the filaments 11 may be performed by air cooling method. For example, the cooling of the filaments 11 may be performed at 15 to 40° C. using a cooling air having a wind speed of 0.2 to 1 m/sec. When the cooling temperature is less than 15° C., elongation is insufficient due to supercooling, so that yarn breakage may occur in a subsequent drawing process. When the cooling temperature exceeds 40° C., a deviation of fineness between the filaments 11 is increased due to irregular solidification, and yarn breakage may occur in the drawing process.

Meanwhile, the method for manufacturing the polyethylene yarn of one embodiment may include converging the cooled plurality of filaments to form a multifilament yarn.

For example, the cooled and completely solidified filaments 11 are converged with a converging device 400 to form a multifilament yarn 10.

Figure 1:
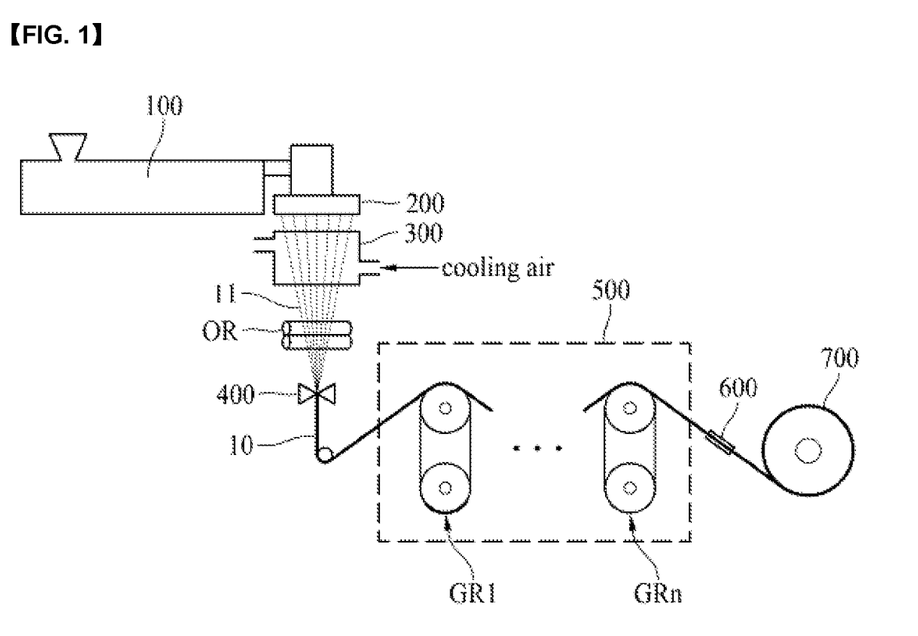
FIG. 1 schematically shows an apparatus for manufacturing a polyethylene yarn according to one embodiment of the present disclosure.

As illustrated in FIG. 1, before forming the multifilament yarn 10, an oiling process of applying an oil to the cooled filaments 11 using an oil roller (OR) or an oil jet may be further performed. The oil applying step may also be performed through a metered oiling (MO) method.

Optionally, when converging the filaments 11 to form a multifilament yarn 10, the oiling step may be performed simultaneously, and an additional oiling step may be further performed during the drawing step and/or just before the winding step.

Meanwhile, the method for manufacturing the polyethylene yarn of one embodiment may include drawing and heat setting the multifilament yarn at a total draw ratio of 8 to 20 times.

At this time, the drawing step may be performed using a plurality of godet rollers, and the heat setting of the multifilament yarn may be performed by the plurality of godet rollers.

Specifically, the multifilament yarn 10 may be drawn at a total draw ratio of 8 to 20 times, more preferably 10 to 15 times.

In order for the final polyethylene yarn to have a strength of 11 g/d or more, the multifilament yarn 10 must be drawn at a total draw ratio of 8 times or more. However, if a total draw ratio of more than 20 times is applied in the drawing step, the risk of yarn breakage of the filament (s) 11 increases.

Meanwhile, the drawing step may be performed in a multi-stage drawing manner, and the relaxation rate at the final drawing during multi-stage drawing may be 3% to 8%.

The present inventors have confirmed that the initial modulus and elongation of the polyethylene yarn are mainly influenced by the relaxation rate at the time of the final drawing in the multi-stage drawing during spinning of polyethylene used as a raw material.

The relaxation rate at the time of the final drawing means a relaxation rate at the time of the drawing lastly performed after drawing but before winding.

In order for the polyethylene yarn to have an initial modulus of 250 g/d or less and an elongation of 6% or more, the relaxation rate at the final drawing during the multi-stage drawing at the time of manufacturing the polyethylene yarn should be 3 to 8%, or 4 to 6%. At this time, if the relaxation rate at the time of the final drawing is too high, it may be difficult to manufacture a polyethylene yarn having a high strength of 11 g/d or more.

Specifically, when the relaxation rate at the final drawing is 3% or less, a modulus of yarn is generated as 250 g/d or more, which can cause problems in flexibility. When the relaxation rate is 8% or more, the movement of yarns on the godet roller may be severe and difficulties in the production may be occurred.

Therefore, in order to manufacture a polyethylene yarn having reduced initial modulus, high elongation and improved wearability, it is preferable to apply the relaxation rate of the final drawing during the multi-stage drawing to the above range.

The polyethylene yarn of the present disclosure can be manufactured by once winding the multifilament yarn 10 as an undrawn yarn, and then unwinding and drawing the unstretched yarn. As illustrated in FIG. 1, the polyethylene yarn can also be manufactured by directly drawing using a drawing part 500 including a plurality of godet rollers GR1 . . . GRn, without winding the multifilament yarn 10, which is an unstretched yarn.

Whichever of the above two steps is applied, in order to minimize the risk of yarn breakage of the filament(s) 11 when drawing the multifilament yarn 10 at a large total draw ratio of 8 to 20 times, the drawing step needs to be precisely controlled. Further, as described above, it is preferable to impart a relaxation rate in the final drawing section of the godet roller to 3% to 8% or less at the time of drawing.

Meanwhile, the method for manufacturing the polyethylene yarn of one embodiment may include winding the drawn multifilament yarn.

As illustrated in FIG. 1, before the drawn multifilament yarn 10 is wound on a winder 700, an entanglement step can be further performed by an entanglement device 600 to improve the converging property and weaving property of the polyethylene yarn.

The polyethylene yarn of the present disclosure manufactured as above can be used for producing protective articles (e.g., protective gloves, underwear, bags, etc.) that require excellent cut resistance.

Hereinafter, a protective article according to one embodiment of the present disclosure will be described in detail.

The protective article of the present disclosure is a protective article knitted with a covered yarn, and may be, for example, a protective glove.

The covered yarn includes a polyethylene yarn of the present disclosure, a polyurethane yarn (e.g., Spandex) spirally surrounding the polyethylene yarn, and a polyamide yarn (e.g., nylon 6 or nylon 66 yarn) spirally surrounding the polyethylene yarn. Depending on the properties of the desired article, polyester yarns (e.g., PET yarns) may be included instead of polyamide yarns.

The weight of the polyethylene yarn may be 45 to 85% of the total weight of the covered yarn, the weight of the polyurethane yarn may be 5 to 30% of the total weight of the covered yarn, and the weight of the polyamide or polyester yarn may be 5 to 30% of the total weight of the covered yarn.

As described above, the polyethylene yarn of the present disclosure may have a weight average molecular weight of 80,000 to 180,000 g/mol, an initial modulus of 100 to 250 g/d, and an elongation of 6 to 10%.

Preferably, the polyethylene yarn may have the initial modulus of 120 to 200 g/d.

Further, the polyethylene yarn may have a dry heat shrinkage at 100° C. of more than 2.5% and 6% or less.

Further, the polyethylene yarn may have a storage elastic retention at 50° C. of 65 to 75%, a storage elastic retention at 80° C. of 30 to 45%, and a storage elastic retention at 105° C. of 10 to 25%.

The protective article of the present disclosure has a cut resistance index of 5 or more and a low stiffness of 5 gf or less, and thus, can exhibit excellent cut resistance and excellent wearability.

Specifically, the protective article may have a cut resistance index according to the EN388: 2016 standard of 5.0 or more, or 5.5 or more, or 5.7 or more, and 8.5 or less, or 8.0 or less, or 7.5 or less, or 7.0 or less, or 6.8 or less. For example, the protective article may have a cut resistance index according to the EN388: 2016 standard of 5.0 to 8.5, or 5.0 to 8.0, or 5.0 to 7.5, or 5.0 to 7.0, or 5.0 to 6.8, or 5.5 to 8.5, or 5.5 to 8.0, or 5.5 to 7.5, or 5.5 to 7.0, or 5.5 to 6.8, or 5.7 to 8.5, or 5.7 to 8.0, or 5.7 to 7.5, or 5.7 to 7.0, or 5.7 to 6.8.

Along with this, the protective article may have a stiffness of 5.0 gf or less, or 4.5 gf or less; and 2.0 gf or more, or 3.0 gf or more, or 3.5 gf or more, or 3.8 gf or more. For example, the protective article may have a stiffness of 2.0 to 5.0 gf, or 2.0 to 4.5 gf, or 3.0 to 5.0 gf, or 3.0 to 4.5 gf, or 3.5 to 5.0 gf, or 3.5 to 4.5 gf, or 3.8 to 5.0 gf, or 3.8 to 4.5 gf.

Hereinafter, the present disclosure will be described in detail with reference to specific examples and comparative examples. However, these examples are only for assisting understanding of the present disclosure, and the scope of the present disclosure should not be limited thereby.

<Manufacture of Polyethylene Yarn>

Preparation Example 1

A polyethylene multifilament entangled yarn containing 240 filaments and having a total fineness of 400 denier was manufactured using the apparatus illustrated in FIG. 1.

Specifically, a polyethylene chip having a weight average molecular weight (Mw) of 150,000 g/mol and a melt index (MI) of 1 g/10 min (at 190° C.) was introduced into an extruder 100 and melted. The polyethylene melt was extruded through a spinneret 200 having 240 nozzle holes.

The filaments 11 formed while being discharged from the nozzle holes of the spinneret 200 were cooled in the cooling part 300 and then converged into the multifilament yarn 10 by a converging device 400.

Next, the multifilament yarn was drawn and heat-fixed at a total draw ratio of 12 times by godet rollers set at 70 to 130° C. in the drawing part 500.

The drawing step was performed in a multi-stage drawing manner, and the relaxation rate at the final drawing during multi-stage drawing was 8%.

Next, the drawn multifilament yarn was wound in a winder 700 after being entangled with an air pressure of 6.0 kgf/cm² in an entanglement device 600. The winding tension was 0.6 g/d.

Preparation Example 2

A polyethylene yarn was obtained in the same manner as in Example 1, except that a polyethylene chip having a weight average molecular weight (Mw) of 150,000 g/mol and a melt index (MI) (at 190° C.) of 1 g/10 min was used, and the relaxation rate at the final drawing during multi-stage drawing was 5%.

Preparation Example 3

A polyethylene yarn was obtained in the same manner as in Example 1, except that a polyethylene chip having a weight average molecular weight (Mw) of 180,000 g/mol and a melt index (MI) (at 190° C.) of 0.8 g/10 min was used, and the relaxation rate at the final drawing during multi-stage drawing was 3%.

Comparative Preparation Example 1

A polyethylene yarn was obtained in the same manner as in Example 1, except that a polyethylene chip having a weight average molecular weight (Mw) of 200,000 g/mol and a melt index (MI) (at 190° C.) of 0.6 g/10 min was used, and the relaxation rate at the final drawing during multi-stage drawing was 2%.

Comparative Preparation Example 2

A polyethylene yarn was obtained in the same manner as in Example 1, except that a polyethylene chip having a weight average molecular weight (Mw) of 200,000 g/mol and a melt index (MI) (at 190° C.) of 0.6 g/10 min was used, and the relaxation rate at the final drawing during multi-stage drawing was 10%.

Test Example 1

The strength, initial modulus, elongation, dry heat shrinkage, storage elastic retention, and weight average molecular weight (Mw) of the polyethylene yarns manufactured in each of Preparation Examples 1 to 3 and Comparative Preparation Examples 1 and 2 were measured by the following methods, and the results are shown in Table 1 below.

(1) Strength (g/d), Initial Modulus (g/d), and Elongation (%)

The strength, elongation and initial modulus of the polyethylene yarn were determined by obtaining strain-stress curves of polyethylene yarns using a universal testing machine (Instron Engineering Corp. Canton, Mass) according to Test Method ASTM D885. Specifically, the sample length was set to 250 mm, the tensile speed was set to 300 mm/min, and the initial load was set to 0.05 g/d. The initial modulus (g/d) was determined from the tangent line giving the maximum gradient near the origin. After measuring 5 times for each polyethylene yarn, the average value was calculated.

(2) Dry Heat Shrinkage

Polyethylene yarn was cut to obtain a sample with a length of 70 cm, and then marked at points 10 cm away from both ends of the sample (i.e., the distance between the marked points=50 cm).

Then, the sample was heated at 100° C. for 30 minutes using a hot air circulation type heating furnace in a state of being hung on a jig so that no load was applied to the sample. Thereafter, the sample was taken out of the heating furnace, cooled slowly up to room temperature, and the distance between the marked points was measured. Then, the dry heat shrinkage at 100° C. of the polyethylene yarn was calculated using the following Equation 1.

Dry Heat Shrinkage (%)=$[(l_0-l_1)/l_0] \times 100$  Equation 1:

(wherein, $l_0$ is the distance between the marked points before heating (that is, 50 cm), and $l_1$ is the distance between the marked points after heating)

The average values of the dry heat shrinkages obtained through two tests were obtained.

(3) Storage Elastic Retention

After preparing a polyethylene yarn sample with a length of 10 mm, the storage elastic modulus at 30° C., 50° C., 80° C., and 105° C. was measured using an intrinsic viscoelasticity measuring device (manufactured by T.A. Instruments, 'DMA Q800'), respectively. Specifically, both ends of the sample were sandwiched between thick papers using an adhesive and a double-sided tape so that no slippage or scattering of filaments between the sample and the device during measurement did not occur. The measurement start temperature was set to −10° C., the measurement end temperature was set to 140° C., and the temperature rising rate was set to 1.0° C./min. The amount of deformation was set to 0.04%, an initial load at the start of the measurement was set to 0.05 cN/dtex, and the measurement frequency was set to 11 Hz. The data was analyzed using "T.A. Universal Analysis" (manufactured by T.A. Instruments). The storage elastic retention at 50° C., the storage elastic retention at 80° C., and the storage elastic retention at 105° C. were respectively calculated by Equation 2 below.

Storage Elastic Retention at $T$° C. (%)=(Storage Elastic Modulus at $T$° C./Storage Elastic Modulus at 30° C.)×100 (where $T$° C.=50° C./80° C./105° C.)  Equation 2:

(4) Weight Average Molecular Weight (Mw) (g/Mol) and Polydispersity Index (PDI)

Polyethylene yarn was completely dissolved in the following solvents, and then, the weight average molecular weight (Mw), number average molecular weight (Mn) and polydispersity index (Mw/Mn: PDI) of the polyethylene yarn were respectively determined using the following gel permeation chromatography (GPC), Analytical instrument: PL-GPC 220 system
  Column: 2×PLGEL MIXED-B (7.5×300 mm)
  Column temperature: 160° C.
  Solvent: trichlorobenzene (TCB)+0.04 wt % dibutylhydroxytoluene (BHT) (after drying with 0.1% CaCl₂))
  Dissolution conditions: after dissolve at 160° C. for 1 to 4 hours, the solution that passed through the glass filter (0.7 μm) was measured
  Injector, Detector temperature: 160° C.
  Detector: RI Detector
  Flow rate: 1.0 ml/min
  Injection volume: 200 μl
  Standard sample: Polystyrene

TABLE 1

|  |  | Preparation Example 1 | Preparation Example 2 | Preparation Example 3 | Comparative Preparation Example 1 | Comparative Preparation Example 2 |
|---|---|---|---|---|---|---|
| PE chip | Mw (g/mol) | 150,000 | 150,000 | 180,000 | 200,000 | 200,000 |
|  | MI at 190° C. (g/10 min) | 1 | 1 | 0.8 | 0.6 | 0.6 |
| PE yarn | Relaxation | 8.0 | 5.0 | 3.0 | 2.0 | 10.0 |
|  | Mw (g/mol) | 140,000 | 140,000 | 160,000 | 180,000 | 180,000 |
|  | Strength (g/d) | 13 | 14 | 15 | 15 | 15 |
|  | Initial modulus (g/d) | 180 | 200 | 230 | 300 | 310 |
|  | Elongation (%) | 10 | 8 | 7 | 6 | 6 |
|  | Dry heat shrinkage at 100° C. (%) | 3.5 | 3.2 | 3.0 | 2.4 | 2.3 |
|  | Storage elastic retention at 50° C. (%) | 68 | 70 | 75 | 84 | 82 |
|  | Storage elastic retention at 80° C. (%) | 37 | 41 | 45 | 56 | 53 |
|  | Storage elastic retention at 105° C. (%) | 20 | 22 | 25 | 32 | 34 |

<Production of Protective Gloves>

Example 1

A covered yarn was produced by spirally surrounding the polyethylene yarn of Preparation Example 1 with 140 denier polyurethane yarn (Spandex) and 140 denier nylon yarn. The weight of the polyethylene yarn was 60% of the total weight of the covered yarn, and the weight of the polyurethane yarn and the nylon yarn was 20% of the total weight of the covered yarn, respectively. The covered yarn was knitted to produce a protective glove.

Example 2

A protective glove was obtained in the same manner as in Example 1, except that the polyethylene yarn of Preparation Example 2 was used.

Example 3

A protective glove was obtained in the same manner as in Example 1, except that the polyethylene yarn of Preparation Example 3 was used.

Comparative Example 1

A protective glove was obtained in the same manner as in Example 1, except that the polyethylene yarn of Comparative Preparation Example 1 was used.

Comparative Example 2

A protective glove was obtained in the same manner as in Example 1, except that the polyethylene yarn of Comparative Preparation Example 2 was used.

Test Example 2

The cut resistance index and the strength of the protective gloves prepared by each of Examples 1 to 3 and Comparative Examples 1 to 2 were respectively measured by the following methods, and the results are shown in Table 2 below.

(1) Cut Resistance Index (CI)

The cut resistance index of the protective glove was measured according to the EN388: 2016 standard.

(2) Stiffness (gf)

Figure 2:
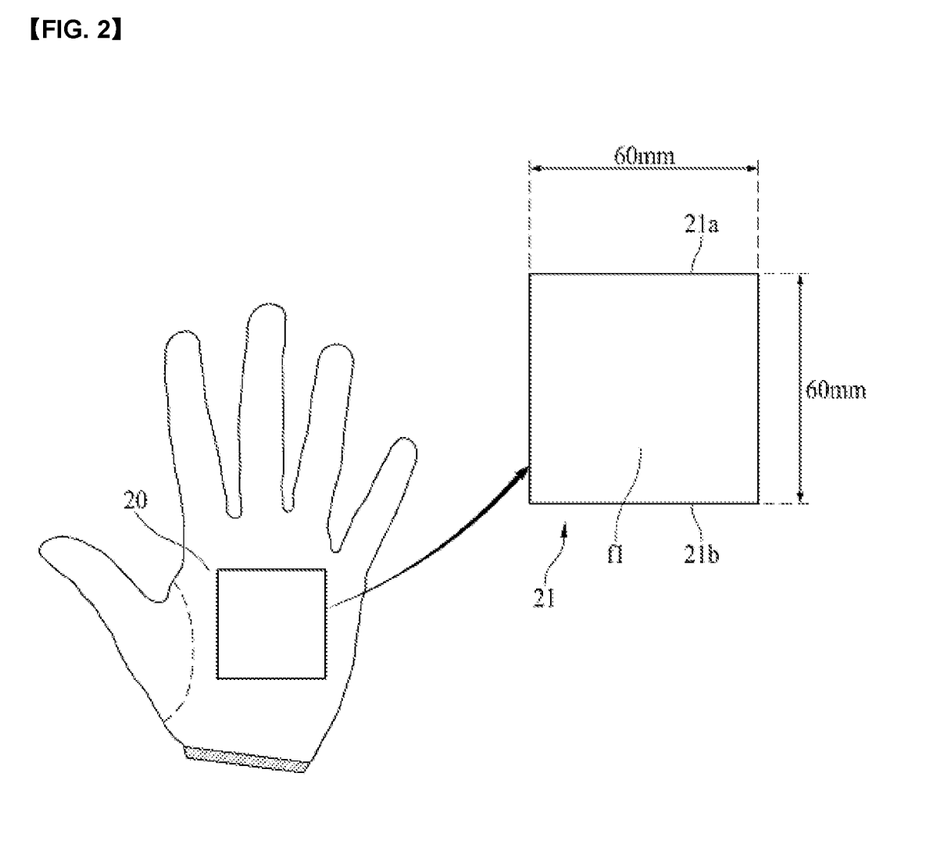
FIGS. 2 and 3 show a method for measuring the strength of a protective glove.
Figure 3:
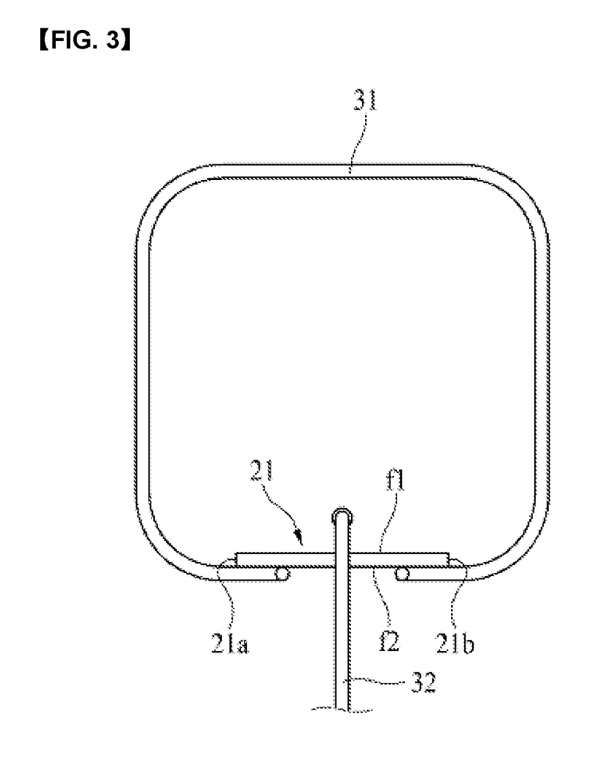

As shown in FIGS. 2 and 3, after collecting a specimen (width: 60 mm, length: 60 mm) 21 from the palm portion of the protective glove 20, the stiffness of the specimen was measured according to Section 38 of ASTM D885/D885M-10a (2014). The measuring device was as follows.

(i) CRE-type Tensile Testing Machine (model: INSTRON 3343)

(ii) Loading Cell, 2 KN [200 kgf]

(iii) Specimen Holder: Specimen holder as specified in section 38.4.3

(iv) Specimen Depressor: Specimen depressor as specified in section 38.4.4.

Specifically, the side (21a) adjacent to the finger of the glove, with the glove outer surface (f1) of the specimen (21) facing upward and the glove inner surface (f2) facing downward, and the opposite side 21b thereof (that is, the side adjacent to the glove wrist) were placed in the center of the specimen holder 31 so that the specimen 21 was directly supported by the specimen holder 31. The specimen 21 remained flat without being bent. At this time, the distance between the specimen supporting part of the specimen holder 31 and the depressing part of the specimen depressor 32 was 5 mm. Then, the maximum strength was measured while raising the specimen holder 31 to 15 mm in a state where the specimen depressor 32 was left without moving.

TABLE 2

|  |  | Example 1 | Example 2 | Example 3 | Comparative Example 1 | Comparative Example 2 |
|---|---|---|---|---|---|---|
| PE yarn | Yarn | Preparation Example 1 | Preparation Example 2 | Preparation Example 3 | Comparative Preparation Example 1 | Comparative Preparation Example 2 |
|  | Initial modulus (g/d) | 180 | 200 | 230 | 300 | 85 |
|  | Elongation (%) | 10 | 8 | 7 | 6 | 13 |
| Protective glove | Cut resistance index | 6.8 | 6.3 | 5.7 | 5.5 | 5.1 |
|  | Stiffness (gf) | 3.8 | 4.0 | 4.5 | 5.2 | 2.8 |

According to Table 2 above, it was confirmed that the protective gloves of Examples 1 to 3 produced using the polyethylene yarns according to Preparation Examples 1 to 3 have low stiffness while having excellent cut resistance, and thus, has improved wearability compared to Comparative Examples 1 and 2.

The invention claimed is:

1. A polyethylene yarn having a weight average molecular weight of 80,000 to 160,000 g/mol, a strength of 11 to 18 g/d, an initial modulus of 150 to 200 g/d, an elongation of 6 to 10%, and a dry heat shrinkage at 100° C. of 3.0 to 3.5%,
    wherein a ratio of a storage elastic modulus at 50° C. to a storage elastic modulus at 30° C. of the polyethylene yarn is 65 to 75%,
    a ratio of a storage elastic modulus at 80° C. to a storage elastic modulus at 30° C. of the polyethylene yarn is 30 to 45%, and
    a ratio of a storage elastic modulus at 105° C. to a storage elastic modulus at 30° C. of the polyethylene yarn is 10 to 25%.

2. The polyethylene yarn according to claim 1,
    wherein the polyethylene yarn comprises 40 to 500 filaments each having a fineness of 1 to 3 denier, and has a total fineness of 100 to 1,000 denier.

3. A method for manufacturing a polyethylene yarn according to claim 1 comprising the steps of:
    melting a polyethylene chip having a weight average molecular weight of 80,000 to 160,000 g/mol and a melt index (MI) (at 190° C.) of 0.3 to 3 g/10 min to obtain a polyethylene melt;
    extruding the polyethylene melt through a spinneret with a plurality of nozzle holes;
    cooling a plurality of filaments formed when the polyethylene melt is discharged from the nozzle holes;
    converging the cooled filaments to form a multifilament yarn;
    drawing and heat setting the multifilament yarn at a total draw ratio of 12 to 20 times; and
    winding the drawn and heat set multi-filament yarn,
    wherein the drawing step is performed in a multi-stage drawing manner, and a relaxation rate at the final drawing during the multi-stage drawing is 5% to 8%.

4. The method for manufacturing a polyethylene yarn according to claim 3,
    wherein the drawing step is performed using a plurality of godet rollers.

5. The method for manufacturing a polyethylene yarn according to claim 3,
    wherein the heat setting of the multifilament yarn is performed by a plurality of godet rollers.

6. A protective article knitted with a covered yarn,
    the covered yarn comprising:
    the polyethylene yarn according to claim 1;
    a polyurethane yarn spirally surrounding the polyethylene yarn; and
    a polyamide or polyester yarn spirally surrounding the polyethylene yarn,
    wherein the protective article has a cut resistance index of 5.5 to 8.5 and a stiffness of 2.0 to 5.0 gf.

7. The protective article according to claim 6,
    wherein the weight of the polyethylene yarn is 45 to 85% of the total weight of the covered yarn,
    the weight of the polyurethane yarn is 5 to 30% of the total weight of the covered yarn, and
    the weight of the polyamide or polyester yarn is 5 to 30% of the total weight of the covered yarn.

* * * * *